(12) United States Patent
Dixon et al.

(10) Patent No.: US 12,253,845 B2
(45) Date of Patent: Mar. 18, 2025

(54) CLOUD EDGE NETWORK PROCESS AUTOMATION CONTROL

(71) Applicant: Verizon Patent and Licensing Inc., Basking Ridge, NJ (US)

(72) Inventors: Allen Edward Dixon, Gunnison, CO (US); James Beacom Terhorst, Ridgway, CO (US); Seth Howard, Denver, CO (US); Rachel Jaret, Potomac, MD (US); Dmitry Galushko, Hoboken, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 446 days.

(21) Appl. No.: 17/812,558

(22) Filed: Jul. 14, 2022

(65) Prior Publication Data

US 2024/0019852 A1 Jan. 18, 2024

(51) Int. Cl.
*G05B 19/418* (2006.01)
(52) U.S. Cl.
CPC ... *G05B 19/4185* (2013.01); *G05B 19/41835* (2013.01); *G05B 19/41865* (2013.01); *G05B 2219/24015* (2013.01)

(58) Field of Classification Search
CPC .......... G05B 19/4185; G05B 19/41835; G05B 19/41865; G05B 2219/24015
See application file for complete search history.

(56) References Cited

U.S. PATENT DOCUMENTS

2022/0124005 A1* 4/2022 Doshi .................. H04L 47/821

FOREIGN PATENT DOCUMENTS

WO WO-2023001442 A1 * 1/2023 ............ B25J 9/1674

* cited by examiner

*Primary Examiner* — Charles Cai

(57) ABSTRACT

A method for cloud edge network process automation control includes receiving, at a multi-access edge computing device, a factory application defining an automated process; and identifying process modules associated with the factory application. The method further includes determining resources required by the process modules associated with the factory application; and assigning, based on the determining of the resources, the process modules to devices for execution within the automated process. The method further includes providing distributed orchestration information to the devices, where the distributed orchestration information includes a status of the process modules; and controlling networked plant devices for middle latency conditions based upon the distributed orchestration information.

20 Claims, 12 Drawing Sheets

CLOUD EDGE NETWORK PROCESS AUTOMATION CONTROL

BACKGROUND

Conventional machines for process control may include hardwired devices having limited processing capabilities, such as, for example, programmable logic controllers (PLCs) and/or process automation controllers (PACs). Conventional process control machinery may present programming and maintenance challenges, and can lack the flexibility for readily reconfiguring the automated process as the need arises.

DETAILED DESCRIPTION OF EXAMPLE EMBODIMENTS

The following detailed description refers to the accompanying drawings. The same reference numbers in different drawings may identify the same or similar elements. The following detailed description does not limit the scope of the invention.

Emerging communications architectures enable advances in process automation which may use standard hardware and software to provide control over a hierarchy of machines executing an automated process. The automated processes can be employed in a variety of environments, including those in industrial automation, power generation, healthcare, manufacturing, agricultural, warehousing, etc. Embodiments presented herein perform control and/or synchronization of a hierarchy of machines, from supervisory control of line level machines to higher level compute facilities which may be cloud based. Intermediary machines may provide an interface between the line level machines and the cloud-based compute facilities. The intermediary machines may include microcontroller-based hardware which can be co-located in the same facility with the line level machines, and/or at least one multi-access edge computing system (MEC), which may interconnect to intermediary machines via a network. Virtual process automation controllers (vPACs), which may be realized in software and/or firmware, may execute on the intermediary machines and/or the MEC to provide control, synchronization, and/or mechanisms for exchanging data. The vPACs, unlike traditional PLCs and/or PACs, may execute within a wide variety of hardware platforms (e.g., single-board computers, personal computers, workstations, etc.) based on open-source software (e.g., Linux), and can provide access to internal data during operation to facilitate installation, upgrades, maintenance, operation and/or optimization of an automated process. As will be presented below in the description of FIG. 1, the type of compute facility (e.g., intermediary machine, MEC, etc.) designated for the execution of a particular vPAC may depend on various performance requirements of the process and may be subject to, for example, latency and/or bandwidth requirements.

Figure 1:
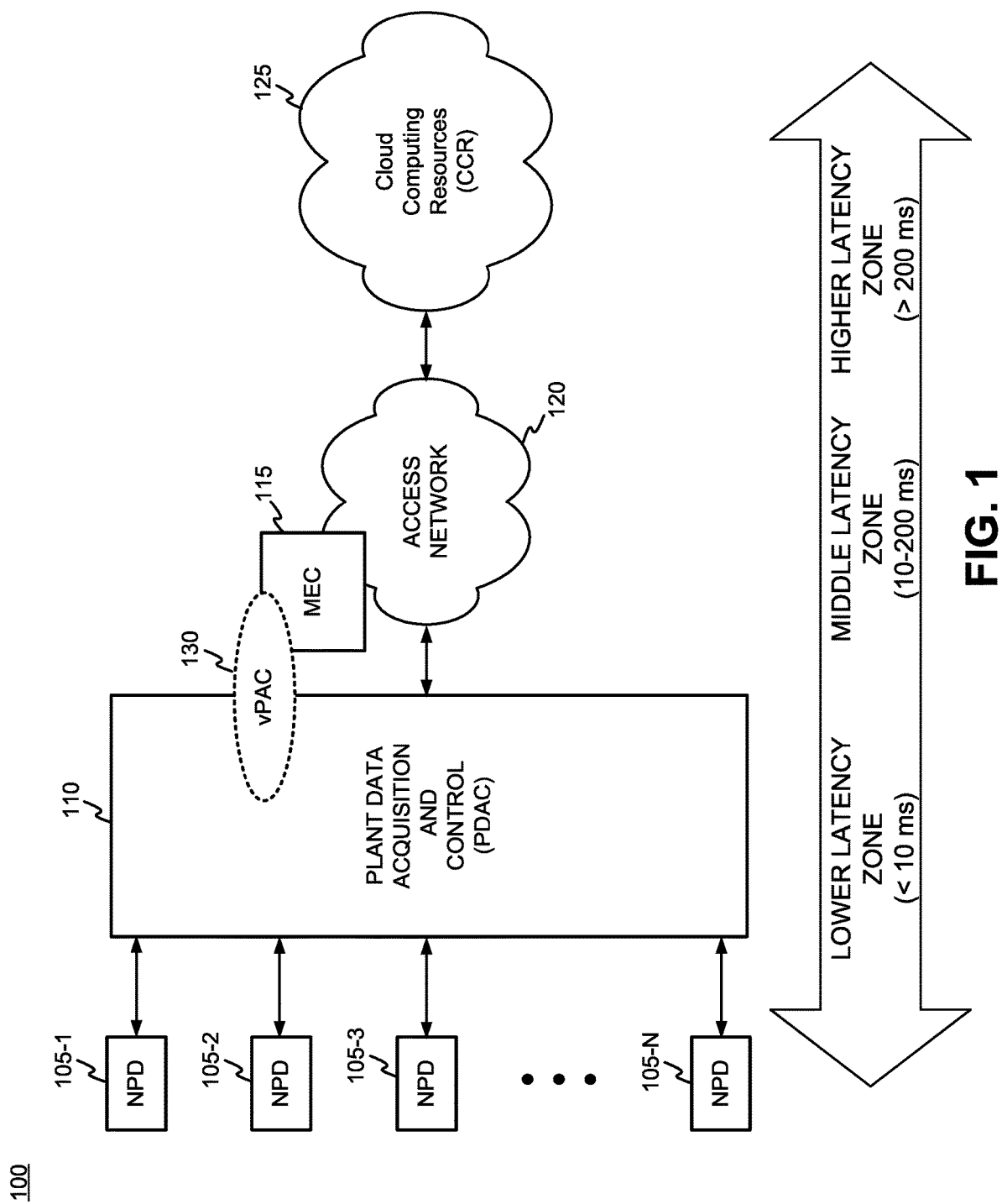
FIG. 1 is a block diagram illustrating an exemplary automated process system (APS) consistent with an embodiment.

FIG. 1 is a diagram illustrating an exemplary automated process system (APS) 100 consistent with an embodiment. As shown in FIG. 1, environment 100 may include network plant devices (NPDs) 105-1 through 105-N (referred to herein collectively as NPDs 105 and individually as NPD 105-x), an intermediary device referred to herein as a plant data acquisition and control device (PDAC) 110, a MEC 115, an access network 120, and cloud computing resources (CCR) 125. One or more vPACs 130 may execute as software and/or firmware within APS 100 to control NPDs 105.

NPDs 105 may be line-level devices that interface with PDAC 110 via an electrical interface suitable for exchanging data to facilitate an automated process. As used herein, a "line-level" device may be a device which operates within a lower latency zone of an autonomous process. For example, in an industrial setting, a line-level device may be devices operating under low latency constraints on a factory floor. As illustrated in FIG. 1, NPDs 105 and PDAC 110, along with their interface, may be capable of operating within a lower latency zone of, for example, 10 milliseconds or less. NPD 105 and PDAC 110 operation within the lower latency zone may be considered fast enough for "real-time control," such as, for example, motion control operations. In an embodiment, MEC 115 may reside in access network 120 as an edge device (e.g., a device at the edge of access network 120) and can interface with PDAC 110 via a wired or wireless network. MEC 115 may operate in a middle latency zone of 10-200 milliseconds, which is sufficient, for example, to issue pick and place commands to NPDs 105 through PDAC 110. As will be presented in the description of FIG. 2, MEC 115 may reside in different locations within access network 120. Access network 120 may interface with CCR 125 via backhauls or a wide area network (not shown). CCR 125 may perform operations which are more computationally demanding than MEC 115 and thus function in a higher latency zone greater than 200 milliseconds, performing computationally intensive functions such as machine learning for modeling the automated process and orchestrating how processes are distributed among the devices shown in FIG. 1.

Further referring to FIG. 1, lower latency zone (far edge) control of NPDs 105 may be performed by vPACs 130 executing in PDAC 110, and middle latency zone (mobile edge) control may be performed by vPACs executing on MEC 115. Programs having higher latency control and other machine learning algorithms that can determine how automated process 100 is controlled and synchronized, and may execute within the higher latency zone (or "cloud") on CCR 125. Accordingly, the control programs for the automated process may be distributed and synchronized throughout all three environments (i.e., lower latency zone, middle latency zone, and higher latency zone) in APS 100.

While control may be deployed across different latency zones within different execution environments, the software providing the overall control of the automated process may be considered to operate as one distributed control application, referred to herein as a factory application. The factory application may be written using a high-level syntax (e.g., Business Process Modeling Notation (BPMN)) as one control program that can be organized into different process modules having different aspects of control. MEC 115 may analyze the factory application (in some embodiments, with assistance from CCR 125) and group operations into process modules for deployment among devices within the latency zones based upon the latency requirements of the process modules. In an embodiment, data for orchestrating the process modules (hereinafter referred to as distributed orchestration information) may also be distributed among the devices in APS 100. MEC 115 may distribute both the orchestration information and process modules appropriate to NPDs 105 to PDAC 110 using one or more vPAC 130 via access network 120. PDAC 110, executing vPAC 130, may send commands using industry standard protocols to NPDs 105. Industry standard protocols may include, for example, MQ telemetry transport (MQTT), open platform communications united architecture (OPC-UA), Profinet, etc. NPDs 105 may return results to vPAC 130 which may record data or forward data to a supervisory control and data access device (SCADA, not shown) which may respond with commands to control the process of manufacturing, generating power, etc. Accordingly, vPAC 130 may control automated process 130, or extend control to an entire factory.

Further referring to FIG. 1, NPDs 105 may include any device which may exchange data over a network using standard industrial networking protocols (e.g., MQTT, OPC-UA, Profinet) for lower latency command and/or data exchange for time critical applications and/or standard networking protocols (e.g., Ethernet, transmission control protocol/internet protocol (TCP/IP)). NPDs 105 may include any portable device operated using a mobile power source (e.g., battery), such as "smart devices," Internet of Things (IoT) devices, security devices (door lock, cameras, perimeter monitors, etc.), line-level devices in a manufacturing plant, monitoring and/or control devices (water, gas, electric, heating ventilation and air conditioning (HVAC) within a home and/or office), medical devices within a hospital or clinic (e.g., infusion pumps, intravenous (IV) drip machines, emergency alerts), devices for monitoring and control of a public utility and/or energy generation utility (e.g., solar panels, wind generators, etc.).

PDAC 110 may include any device which may exchange data with NPDs 105 within lower latencies (<10 ms) and exchange data with MEC 115 within middle latencies (10-200 ms). PDAC programs may include software and/or firmware, which may include one or more vPACs 130. Software executing on PDAC 110, such as the operating systems, vPACs 130, utilities, and/or other applications may operate using open source software and thus provide visibility into operations, input data, output data, and intermediary data (e.g., for troubleshooting). Moreover, programs executing on PDAC 110 may not be "siloed" or tied to any one particular manufacturer, thus permitting interoperability among different NPDs 105 and/or MECs 115. PDAC 110 may reside within an automated facility in close proximity to NPDs 105 for lower latency operation and can be realized as, for example, a single board computer (Linux-based Raspberry PI), a personal computer (Intel and/or ARM based machines using Linux, Unix, and/or other suitable operating systems), etc.

MEC 115 may reside in access network 120 and can exchange data with PDAC 110 under middle latency conditions (10-200 ms), and exchange data with CCR 125 under higher latency conditions (<200 ms). As will be illustrated in more detail with reference to FIG. 2, varied placement of MEC 115 (from a geographic and/or network topology perspective) within access network 120 may permit data exchanges between MEC 115 and PDAC 110 under middle latency conditions. The devices within MEC 115 may be sufficiently powerful enough to offload services that traditionally were implemented by CCR 125, and thus execute the offloaded services with reduced latency. In addition to permitting the offloading of computational loads from CCR 125, MEC 115 allows the reduction of traffic congestion with access network 120.

Access Network 120 may provide the networking services for MEC 115 to exchange data with PDAC 110 and NPDs 105 via vPACs 130. Access network 120 may further permit data exchange with MEC 115 and CCR 125 (e.g., via a wide area network (WAN) as described in relation to FIG. 2). Access network 120 may allow the exchange of data for industrial networking protocols (e.g., MQTT, OPC-UA, Profinet, etc.), IP services and/or non-IP data delivery services, mobile telephone service, Short Message Service (SMS), Multimedia Message Service (MMS), multimedia broadcast multicast service (MBMS), Internet access, and/or other types of data services. Access networks 120 may include or may be incorporated into a packet data network connection between UE 110 and WAN 140 which may provide connectivity to one or more network devices 150. Access network 120 may be any type of wired and/or wireless network. In some implementations, access networks 120 may include a 4G wireless network which may, for example, utilize the Long Term Evolution (LTE) standard and thus include an evolved packet core (EPC) network. Furthermore, access networks 120 may include an LTE Advanced (LTE-A) access network, a 5G access network, and/or other advanced network that includes functionalities that are associated with, for example: 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (Het-Nets) of overlapping small cells and macrocells; Self-Organizing Network (SON); MTC such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G technology.

CCR 125 may include on-demand, network accessible computer system resources, including data storage space and computing power which may scale with dynamic requirements. In APS 100, CCR 125 may be used to perform tasks using a high level of computational resources, such as, machine language training and execution, inter-machine orchestration, and controlling operations suitable within a higher latency zone (>200 ms). As presented in the description of FIG. 5, CCR 125 may use machine learning models (e.g., training and execution) to determine the placement of process modules within different latency zones to improve the efficiency of APS 100. CCR 125 may operate without direct active management by users associated with the operations of APS 100. CCR 125 may have functions distributed over multiple locations, and may feature the sharing of resources to achieve computational performance goals and economies of scale, where services may be paid on a subscription basis. Examples of CCRs 125 may include, for example Amazon Web Services (AWS), Microsoft Azure, Google Compute Engine, etc.

VPAC 130, shown in FIG. 1 using a dashed line to indicate a virtual controller (i.e., implemented substantially in software and/or firmware), may be a collection of "process modules" and/or distributed data structures which may be arranged to control and synchronize (i.e., orchestrate) automated processes within APS 100. VPACs 130 may be placed within various latency zones depending upon the speed of execution of each vPAC 130. Such placement can be adjusted in an ongoing manner, facilitated by MEC 120 and/or CCR 130, depending upon changes (in hardware and/or software) which may occur in the automated process and/or the APS facility over time. Accordingly, if a particular vPAC 130-x is completing a task too quickly (that is, the results of vPAC 130-x are not being used within a predetermined time), execution of vPAC 130-x may reassigned to a higher latency zone. Alternatively, if vPAC 130-x is not producing results quickly enough, it may be reassigned into a lower latency zone to produce results in a timelier manner. VPAC 130 placement may be performed using machine learning techniques executed by MEC 115 and/or CCR 125. Alternatively, placement may be performed manually by human intervention if desired.

Although FIG. 1 shows exemplary components of APS 100, in other implementations, APS 100 may include fewer components, different components, differently arranged components, or additional components than depicted in FIG. 1. Additionally or alternatively, one or more components of APS 100 may perform functions described as being performed by one or more other components of APS 100.

Figure 2:
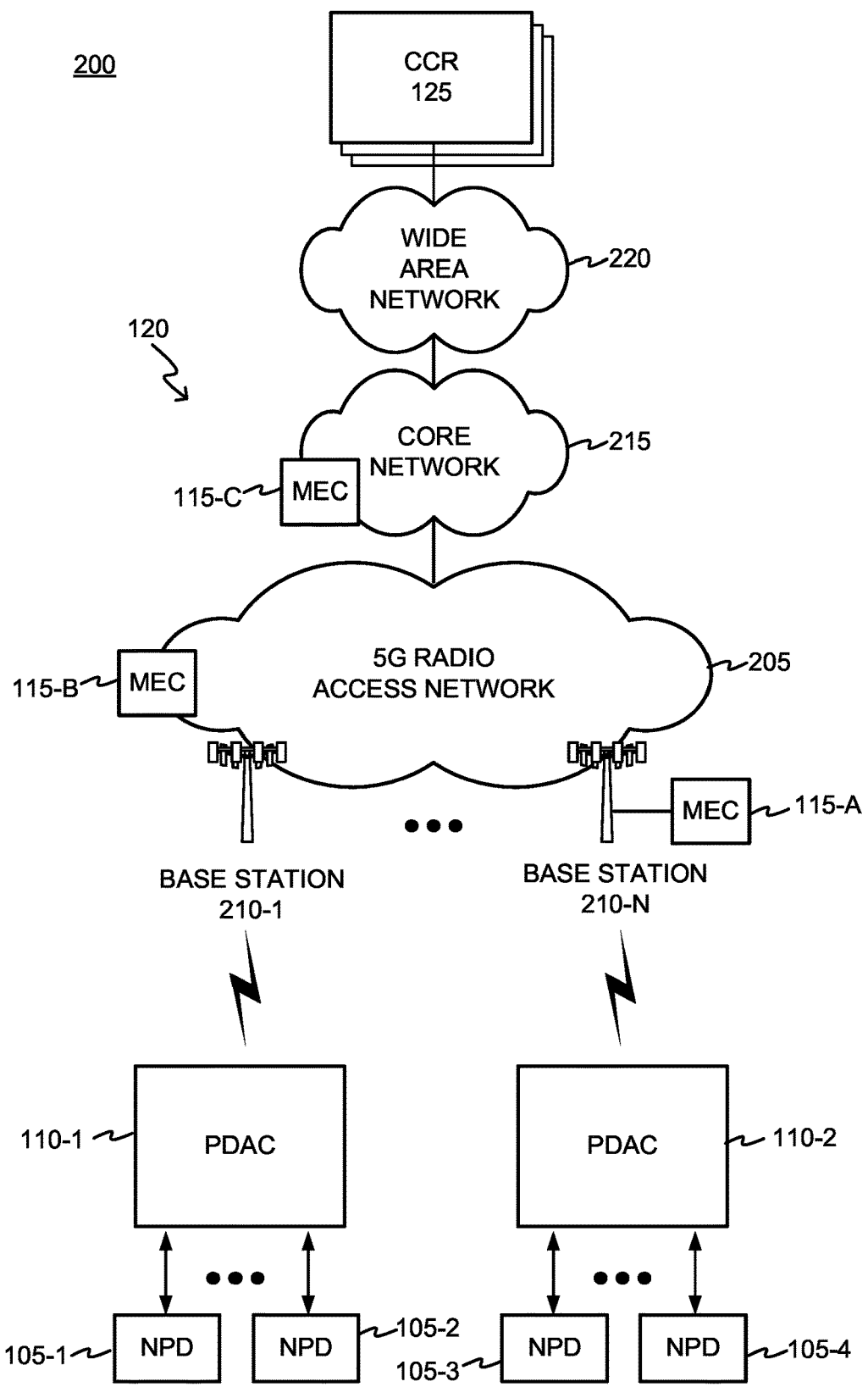
FIG. 2 is a diagram showing a networking environment based on a fifth generation (5G) wireless standard associated with an exemplary APS.

FIG. 2 is a diagram showing a networking environment based on a fifth generation (5G) wireless standard associated with an exemplary APS. APS 200 may include NPDs 105-1 to 105-4 (referred to herein collectively as NPDs 105 and individually as NPD 105-x), PDACs 110-1 to 110-2 (referred to herein collectively as PDACs 110 and individually as PDAC 110-x), MEC 115 (wherein MEC 115-A to MEC 115-C represent MEC 115 in a different location within the network topology of APS 200), CCR 125, 5G radio access network 205, base stations 210-1 to 210-N (referred to herein collectively as base stations 210 and individually as base station 215-x), core network 215, and wide area network 220.

NPDs 105 may interface with PDACs 110 via an industrial electrical interface having low latency for exchanging both data and commands for performing an automated industrial process. NPDs 105 and PDAC 110, along with their industrial interface, may be capable of operating within a lower latency zone of, for example, 10 ms or less, for "real-time control" and/or diagnostics. In an embodiment, an electrical interface between NPDs 105 and PDACs 110 may be, for example, based on the "IO Link" standard.

PDACs 110 may exchange data over 5G radio access network 205, via base stations 210, with MEC 115. MEC 115 may reside in various locations within access network 120 operating as an edge device to exchange data via base stations 115. As noted in the description of FIG. 1, MEC 115 may operate in the middle latency zone ranging, for example, from 10 ms to 200 ms. If it is desirable for an automated process to consistently operate in the lower end of the middle latency zone range, MEC 115 may be placed at the edge of access network 120, such as, for example, MEC 115-A proximate to base station 210-N. If it is desirable for an automated process to consistently operate in the center of the middle latency zone, such as, for example, ~100 ms, MEC 115 may be placed within 5G radio access network 205, such as, for example, MEC 115-B. If it is desirable for an automated process to consistently operate in the higher end of the middle latency zone range, MEC 115 may be placed at core network 215, such as, for example, MEC 115-C. Regardless of the location of within 5G radio access network 205 and/or core network 205, MEC 115 may exchange data with CCR 125 via wide area network 220.

5G radio access network (RAN) 205 may include one or more base stations 210, central units (CUs), distributed units (DUs), and radio units (RUs) (not shown in FIG. 2) that enable and manage connections from PDACs 110 to core network 215. 5G RAN 205 may include features associated with management of: CUs, DUs, and 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; ultra-wideband (UWB) functionality; MTC functionality, and/or other 5G functionality.

Base stations 210 may support 5G and/or other types of wireless access networks for connectivity with elements exchanging data with 5G radio access network 205, core network 215, and/or wide area network 220. Base stations 210 may support uplink and downlink channels for wireless connectivity between PDAC 110 and MEC 115 and/or other network elements within 5G radio access network 205 and/or devices connected to core network 215, wide area network 220, and/or CCR 125. Base stations 210 may support any type of wireless network, such as, for example, a telecommunications network wireless local area network(s) (LAN) (e.g., WiFi), wireless wide area networks (WAN) (e.g., WiMax), and/or one or more wireless public land mobile networks (PLMNs). The PLMN(s) may include 5G systems, which may operate at higher frequencies, such as, for example, about 28 GHz, a Global System for Mobile Communications (GSM) PLMN, a Long Term Evolution (LTE) PLMN, and Advanced LTE PLMN, and/or other types of PLMNs not specifically described herein.

Core network 215 may be a 5G core networking infrastructure that provides core network functions, such as mobility management, session management, broadcast/multicast functionality, authentication, and/or packet transport for wireless communications (e.g., communications for PDACs 110, base stations 210, etc.). Additionally or alternatively, various embodiments may use other networking cores compatible with known wireless communication standards, which may include, for example, LTE, LTE Advanced, Global System for Mobile Communications (GSM), Universal Mobile Telecommunications System (UMTS), IS-2000, etc.

Wide area network 220 may include any type of high speed, large-scale distributed network such as, for example, a metropolitan area network (MAN), an optical network, a video network, a satellite network, an intranet, or a combination of networks. Wide area network 220 may allow the delivery of IP and/or non-IP services to/from MEC 115, and/or CCR 125, and may interface with other external networks. Wide area network 220 may include one or more server devices and/or network devices, or other types of computation or communication devices.

Although FIG. 2 shows exemplary components of networking environment 200, in other implementations, networking environment 200 may include fewer components, different components, differently arranged components, or additional components than depicted in FIG. 2. Additionally, or alternatively, one or more components of networking environment 200 may perform functions described as being performed by one or more other components of environment 200.

Figure 3:
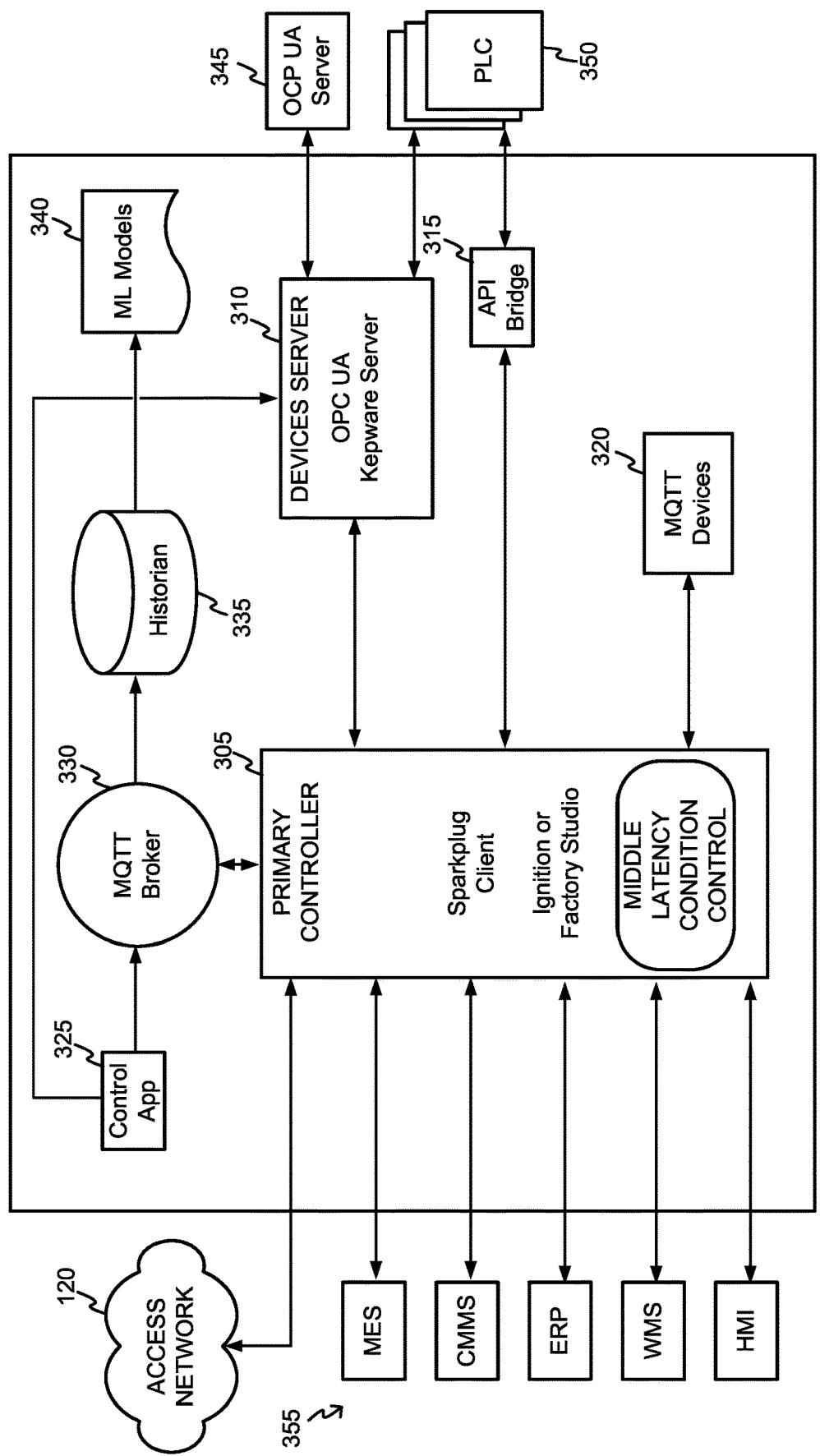
FIG. 3 is a block diagram of a multi-access edge computing device (MEC) associated with an exemplary APS.

FIG. 3 is a block diagram showing functional features of an exemplary multi-access edge computing device (MEC) 115 according to an embodiment. In an embodiment, MEC 115 may include primary controller 305, devices server 310, applications programming interface (API) bridge 315, MQTT devices 320, control applications module 325, MQTT broker 330, historian 335, and ML models 340.

In an embodiment, MEC 115 operates as an edge device within the middle latency zone for issuing various commands to NPDs 105 through PADAC 110 and receiving operational data and status information from NPDs 105 through PADAC 110. MEC 115 permits flexible placement of network resources to reduce latency when exchanging commands/data with PDAC 110. MEC 115 and may include various devices at an edge within access network 120 in proximity to PDAC 110 (e.g., proximity based on a geographic and/or network topology perspective). The devices within MEC 115 may implement services that are or can be implemented by CCR 125 and perform them with reduced latency. This may permit, for example, processing to be offloaded from CCR 125. MEC 115 may be a system composed of multiple devices with computing and storage capabilities that are deployed at the edge of the network, i.e., close to the users of network services. MEC 115 reduces latency and enables contextual information and real-time awareness of the local environment. In addition to permitting the offloading of computational loads from CCR 125, MEC 115 may allow a reduction in the amount of traffic in access network 120.

Primary controller 305 may execute processes appropriate for the middle latency condition control of NPDs 105 (i.e., within middle latency zone shown in FIG. 1), assign processes to other zones, and/or monitor the effectiveness of processes placed in other latency zones. In an embodiment, primary controller 305 may execute one or more vPACs 130, and/or partially run a vPAC 130, for controlling NPDs 105. Process controller 305 may communicate with other devices in APS 100 by acting as an MQTT client. In an embodiment, an MQTT client may be any device that utilizes an MQTT library and/or executes MQTT protocol to communicate with other devices. MQTT devices may include external devices such as NPDs 105 as shown FIG. 1, and/or internal MQTT devices 320 within MEC 115. Primary controller 305 may exchange information with MQTT broker 330 to facilitate MQTT communications with existing devices in APS 100 and/or newly introduced devices if APS 100 is modified.

Primary controller 305 may execute on one or more platforms and/or systems for communicating and/or controlling NPDs 105. Primary controller 305 may include, for example, a Sparkplug Client, Ignition, and/or Factory Studio. A Sparkplug Client may include a client library for MQTT communications within the Sparkplug specification, which is an open specification for bi-directional communications associated with edge of network devices (e.g., gateways) and/or native MQTT enabled end devices. Ignition includes an integrated software platform for supervisory control and data acquisition (SCADA) which can be based on a structured query language (SQL) database architecture. Ignition may include cross platform web-based deployment and includes components which may perform real-time control, status control, alarming, reporting, data acquisition, scripting, scheduling, etc. Factory Studio may provide supervisory control and/or data acquisition which can further include alarm management, user interface management (e.g., dashboard designer), data aggregation and publishing, data visualization, hardware integration, real time monitoring, etc.

Primary controller 305 may, for example, use a Sparkplug Client, Ignition, and/or Factory Studio to control and/or monitor external devices such as NPDs 105 by exchanging commands and/or data with various software systems and interfaces 355 residing in NPDs 105, PDAC 110, MEC 115, vPAC 130s, and/or other devices. The commands and/or data may be provided via access network 120 as described in FIGS. 1 and 2. Software systems and interfaces 355 may include: a manufacturing execution systems (MES) for tracking and/or documenting the transformation of raw/intermediate materials into finished products; a computerized maintenance management system (CMMS) to facilitate the process of maintenance operations of devices within APS 100; an enterprise resource planning system (ERP) to manage aspects of facility operations and processes, from, for example, production to payroll; and a warehouse management system (WMS) to control and administer warehouse operations from the time goods enter a facility until they exit; and a human machine interface (HMI) to communicate commands and collect data among NPDs 105.

Devices server 310 may exchange information with primary controller 305 to facilitate communications among external devices within APS 100. In addition, devices server 310 may execute one or more standard software systems and/or protocols for exchanging data and commands with external servers and/or devices. In an embodiment, devices server 310 may execute open platform communications architecture (OPC UA) Kepware server platform. OPC UA includes a data exchange standard for industrial communication (machine-to-machine or personal computer-to-machine communication). OPC UA may be independent of the manufacturer and/or system supplier of the application, of the programming language in which the respective software was programmed, and/or of the operating system on which the application is running. Kepware server software may provide a single source of industrial automation data applications in APS 100. The platform design allows users to connect, manage, monitor, and control diverse automation devices and software applications through one intuitive user interface. Devices server 310 may exchange information with an external server (e.g., OCP UA server 345) to interface with other devices in APS 100. Devices server 310 may interface with devices associated with PLCs 350. Additionally or alternatively, primary controller 305 may interface with PLCs 350 via an API bridge 315. Devices server 310 may further receive commands (e.g., via a factory application) from directly control application 325.

MQTT broker 330 can support the publish/subscribe protocol that can be used with MQTT devices, and process MQTT messages for connected clients including NPDs 105 and/or MQTT devices 320. Control applications 325, such as, for example a factory application (described in relation to FIGS. 6 and 8), may exchange messages for MQTT broker 330 for processing. MQTT broker may archive various messages and/or commands in historian 335 (utilizing, for example, a database) which may be used to support machine learning (ML) models 340 which may be output to other devices in APS 100. The ML models may learn how to place various process modules with the proper latency zones to optimize the operations of APS 100, and make changes when modifications to APS 100 are implemented.

Although FIG. 3 shows exemplary features of MEC 115, in other implementations, MEC 115 may include fewer components, different components, differently arranged components, or additional components than depicted in FIG. 3. Additionally or alternatively, one or more components of MEC 115 may perform functions described as being performed by one or more other components of MEC 115.

Figure 4:
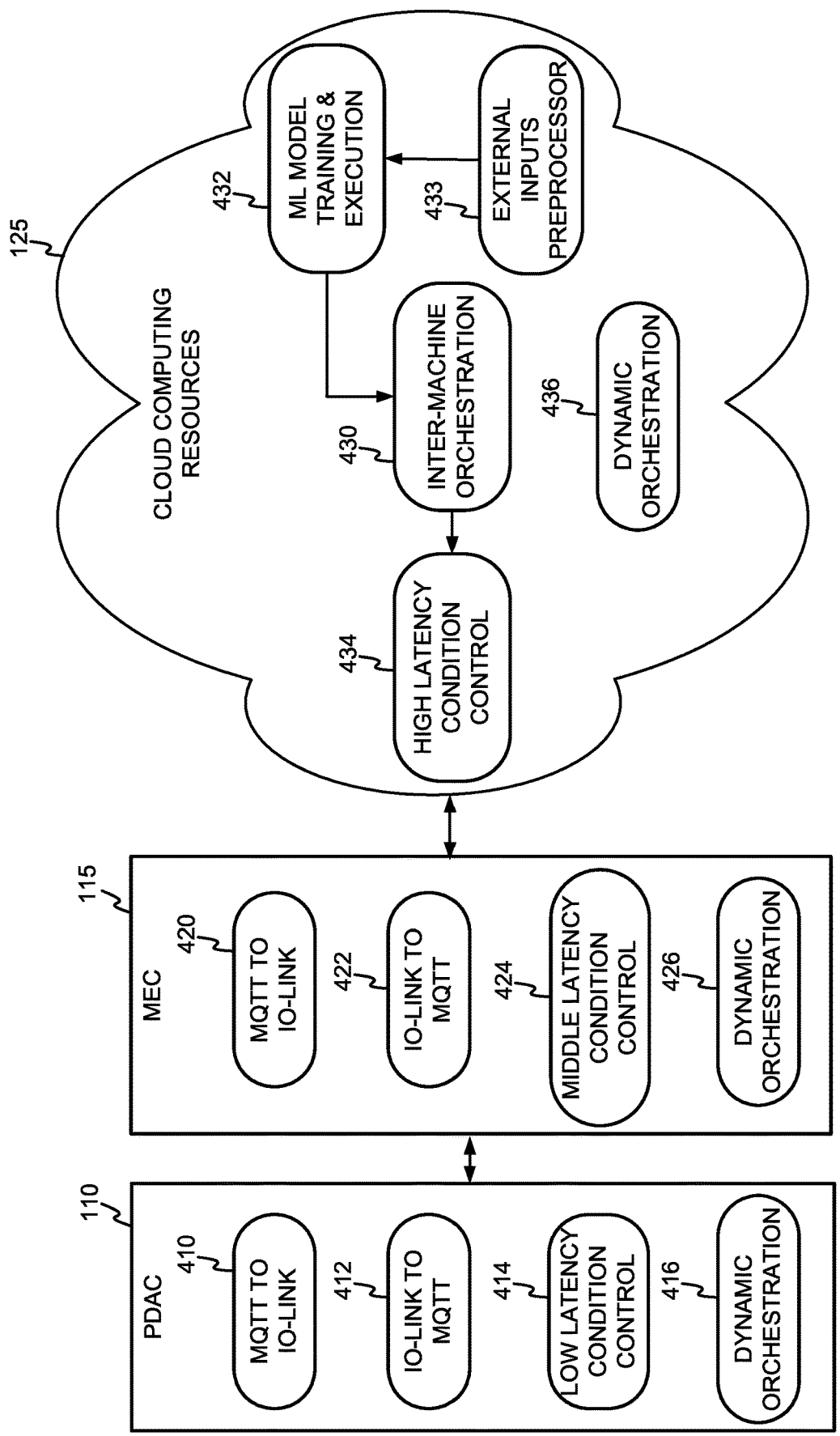
FIG. 4 is a block diagram showing functional blocks associated with an exemplary APS.

FIG. 4 is a block diagram showing executable components associated with PDAC 110, MEC 115, and CCR 125 within an exemplary APS 100. NPDs 105, which may interface with, for example, PDAC 110 over an IO Link, are not shown in FIG. 4 for clarity.

The executable components associated with PDAC 110 may include MQTT-to-IO-link 410, IO-link-to-MQTT 412, low latency condition control 414, and dynamic orchestration 416. The executable components associated with MEC 115 may include MQTT-to-IO-link 420, IO-link-to-MQTT 422, middle latency condition control 424, and dynamic orchestration 426. The executable components associated with CCR 125 may include inter-machine orchestration 430, ML model training and execution 432, external inputs 433, high latency condition control 434, and dynamic orchestration 436.

The executable components shown in FIG. 4 may be implemented in any combination of software, firmware, and/or hardware. Moreover, various executable components shown in FIG. 4, such as, for example, low latency condition control 414, middle latency condition control 424, and/or high latency condition control 435, may be automatically distributed and synchronized within each of their respective host environments (e.g., PDAC 110, MEC 115 and/or CCR 125). In other embodiments, executable components may operate in an asynchronous or partially asynchronous manner.

Within PDAC 110, MQTT-to-IO-link 410 may process incoming MQTT messages from MEC 115, and subsequently convert them to IO-link messages prior to sending them to one or more NPDs 105. MQTT messages may include commands for instructing one or more NPDs 105 to execute a task. The MQTT protocol provides minimal overhead and efficiency for transferring data in machine-to-machine (M2M) and internet of things (IoT) contexts. Given the lower latency conditions for which NPDs 105 operate, NPDs 105 may utilize the IO-link standard for communications on a plant floor in an automated process. IO-link may be based on a bi-directional, digital, point-to-point, wired and/or wireless, industrial communications networking standard (e.g., IEC 61131-9). IO-link may be suited for connecting digital sensors, actuators, and/or various plant devices to an industrial fieldbus and/or a type of industrial Ethernet. IO-Link enables the development and operation of sensors and/or actuators that can produce and consume enriched sets of data for economically operating industrial automated processes. IO-link-to-MQTT 412 may process incoming IO-link messages from one or more NPDs 105 and subsequently convert them to MQTT messages prior to sending them to MEC 115. Low latency condition control 414 may execute process modules associated with a factory application which may require lower latency conditions, such as, for example under 10 ms. Lower latency condition control 414 may provide sufficient real-time control used in, for example, motion control applications. Dynamic orchestration 416 may provide dynamic control for the factory application which may include monitoring, synchronizing, and moving process modules base upon latency requirements.

Within MEC 115, MQTT-to-IO link 420 may receive MQTT messages, generated by MEC 115 itself and/or received from CCR 125. MQTT-to-IO link 420 may subsequently convert the MQTT messages to IO-link messages. The converted IO-link messages may include commands which may be sent to one or more NPDs 105 via PDAC 110. The commands may control NPDs 105 within the middle latency zone. Such conversion may be sufficient, for example, issuing pick and place commands to NPDs 105. IO-Link to MQTT 422 may process incoming IO-Link messages generated by NPDs 105 received via PDAC 110, and subsequently convert them to MQTT for middle latency zone monitoring and/or control. Received MQTT messages may include performance and/or diagnostic data generated by one or more NPDs 105. Middle latency condition control 424 may execute process modules associated with a factory application which may require middle latency conditions, such as, for example 10-200 ms. Middle latency control may be sufficient for non-real-time control used in, for example, pick and place commands executed by NPDs 105. Dynamic orchestration 426 may provide dynamic control for the factory application which may include monitoring, synchronizing, and moving process modules based upon latency requirements.

Within CCR 125, an external inputs preprocessor 433 may receive various inputs from different sources and process the received inputs for use by machine learning (ML) model training and execution 432. The received inputs may include external information regarding the automated process, manual (operator based) inputs regarding placement of process modules in various latency zones, and/or corporate information including, for example, influences related to supplier information, contractual obligations, and/or other business related informatoin. ML model training and execution 432 may use machine learning techniques (e.g., neural nets) for automatically determining placement of process modules of a factory application within a latency zone. Inter-machine orchestration 430 receive information from ML model training and execution 432 for coordinating the interaction and synchronization of process modules within PDAC 110, MEC 115, and/or CCR 125. High latency condition control 434 may execute process modules that may require higher latency conditions, such as, for example latencies greater than 200 ms. High latency control may be sufficient for performing computationally intensive functions such as, for example machine learning for modeling the automated process and orchestrating how processes are distributed among NPDs 105. Dynamic orchestration 436 may provide dynamic control for the factory application which may include monitoring, synchronizing, and moving process modules based upon the latency requirements of the process modules during operation of APS 100.

While the executable blocks shown in FIG. 4 as low latency condition control 414, middle latency condition control 424, and high latency condition control 434 may be separately deployed at PDAC 110, MEC 115 and CCR 125, respectively, the executable components may be considered as one distributed control application program. As discussed in detail with respect to FIGS. 6-9C, aspects of control (e.g., process modules) may be moved between PDAC 110, MEC 115, and/or CCR 125 for operation in the appropriate latency zone.

Figure 5:
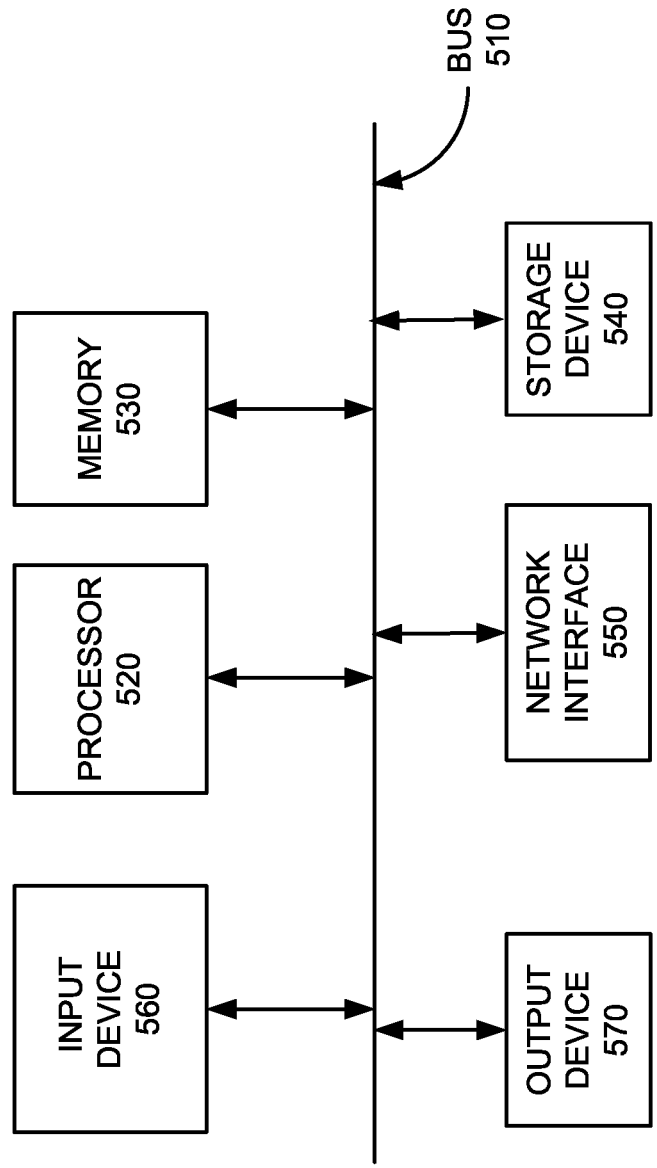
FIG. 5 is a block diagram showing exemplary components of a network device according to an embodiment.

FIG. 5 is a block diagram showing exemplary components of a network device 500 associated with APS 100 according to an embodiment. Network device 500 may include one or more network elements illustrated in FIGS. 2-3 such as, for example, NPD 105, PDAC 110, MEC 115, and/or CCR 125. In some embodiments, there may be a plurality of network devices 500 providing functionality of one or more network elements. Alternatively, network device 500 may perform the functionality of any plurality of network elements. As shown, network device 500 may include a bus 510, a processor 520, a memory 530, storage device 540, a network interface 550, input device 560, and/or an output device 570.

Bus 510 includes a path that permits communication among the components of network device 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic. For example, processor 520 may be an x86 based CPU, and may use any operating system, which may include varieties of the Windows, UNIX, and/or Linux operating systems. Processor 520 may also use high-level analysis software packages and/or custom software written in any programming and/or scripting languages for interacting with other network entities.

Memory 530 may include any type of dynamic storage device that may store information and/or instructions, for execution by processor 520, and/or any type of non-volatile storage device that may store information for use by processor 520. For example, memory 530 may include a random access memory (RAM) or another type of dynamic storage device, a read only memory (ROM) device or another type of static storage device, and/or a removable form of memory, such as a flash memory. Storage device 540 may include any type of on-board device suitable for storing large amounts of data, and may include one or more hard drives, solid state drives, and/or various types of redundant array of independent disks (RAID) arrays. In an embodiment, storage device 440 may store vPACs 130, distributed orchestration information such as, for example, process tables, factory application instructions for controlling an automated process, and/or listen update tables.

Network interface 550 may include a transceiver that enables network device 500 to communicate with other devices and/or systems in APS 100 environment. Network interface 550 may be configured to exchange data over wired communications (e.g., conductive wire, twisted pair cable, coaxial cable, transmission line, fiber optic cable, and/or waveguide, etc.), or a combination of wired and wireless communications. In other embodiments, network interface 550 may interface with other devices using a wireless communications channel, such as, for example, radio frequency (RF), infrared, and/or visual optics, etc. Network interface 550 may include a transmitter that converts baseband signals to RF signals and/or a receiver that converts RF signals to baseband signals. Network interface 550 may be coupled to one or more antennas for transmitting and receiving RF signals. Network interface 550 may include a logical component that includes input and/or output ports, input and/or output systems, and/or other input and output components that facilitate the transmission/reception of data to/from other devices. For example, network interface 550 may include a network interface card (e.g., Ethernet card) for wired communications and/or a wireless network interface (e.g., a WiFi) card for wireless communications. Network interface 550 may also include a universal serial bus (USB) port for communications over a cable, a Bluetooth® wireless interface, a radio frequency identification device (RFID) interface, a near field communications (NFC) wireless interface, and/or any other type of interface that converts data from one form to another form.

Input device 560 may allow an operator to input information into device 500. Input device 560 may include, for example, a keyboard, a mouse, a pen, a microphone, a remote control, an audio capture device, an image and/or video capture device, a touch-screen display, and/or another type of input device. In some embodiments, device 500 may be managed remotely and may not include input device 560. In other words, device 500 may be "headless" and may not include a keyboard, for example.

Output device 570 may output information to an operator of device 500. Output device 570 may include a display, a printer, a speaker, and/or another type of output device. For example, output device 570 may include a display, which may include a liquid-crystal display (LCD) for displaying content to the customer. In some embodiments, device 500 may be managed remotely and may not include output device 570. In other words, device 500 may be "headless" and may not include a display, for example.

As described below, network device 500 may perform operations relating to controlling and orchestrating an automated process. Network device 500 may perform these operations in response to processor 520 executing software instructions contained in a computer-readable medium, such as memory 530 and/or storage device 540. The software instructions may be read into memory 530 from another computer-readable medium or from another device. The software instructions contained in memory 530 may cause processor 520 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the flow charts shown in FIGS. 6-7.

Although FIG. 5 shows exemplary components of network device 500, in other implementations, network device 500 may include fewer components, different components, additional components, or differently arranged components than depicted in FIG. 5.

Figure 6:
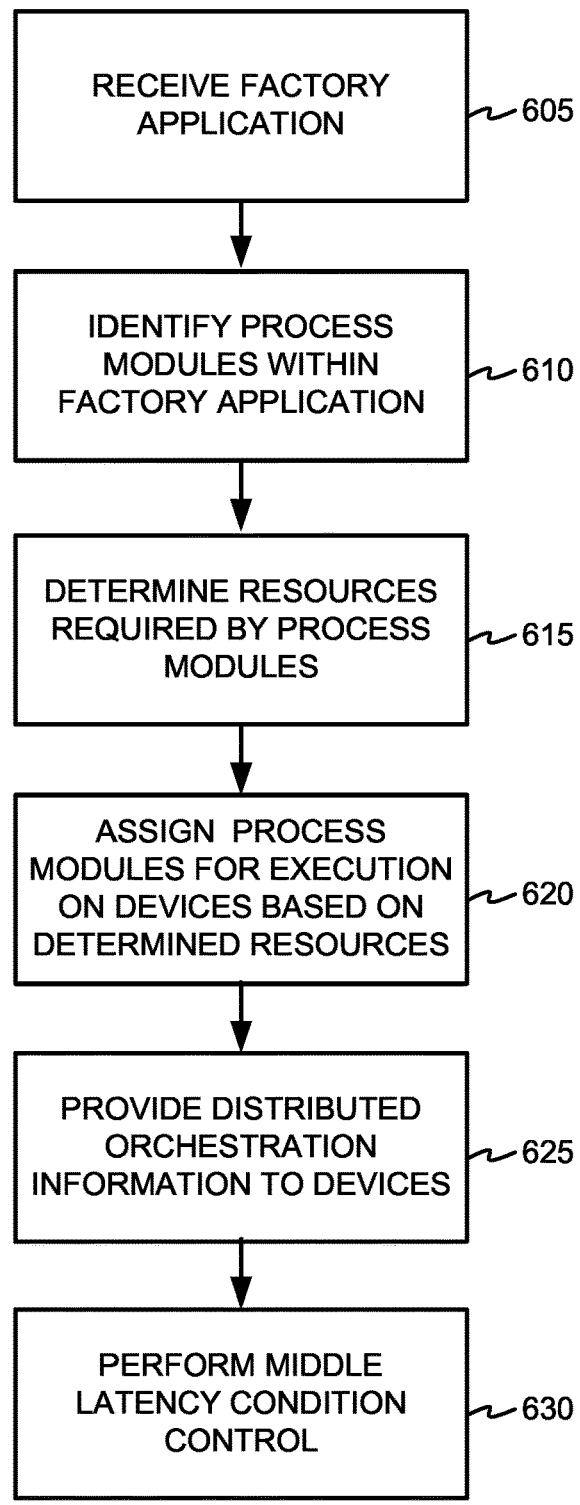
FIG. 6 shows a flowchart of an exemplary process for a MEC within an APS.

FIG. 6 shows a flow chart of an exemplary process 600 for dynamic control of an automated process. Process 600 may be performed, for example, by network device 500 using processor 520. In an embodiment, network device 500 may be embodied as MEC 115. However, in other embodiments, alternate or additional devices (e.g. PDAC 110) can be associated with the execution of at least a part of process 600.

Network device 500 may receive a factory application defining an automated process (e.g., an industrial process) for APS 100 (Block 605). The factory application may define an automated process where constituent parts can be distributed to appropriate devices (e.g., PDAC 110, MEC 115, CCR 125) within APS 100. The factory application may be received via access network 120. In an embodiment, CCR 125 may send MEC 115 the factory application via wide area network 220, core network 215, and/or 5G radio access network 205. A factory application may represent an automated process at a level which may be sufficiently detailed to enable APS 100 to perform a set of desired tasks. However, a factory application may not have to be presented at such a fine level of detail such that an operator has to consider a large number of lower-level technical aspects regarding the implementation of the automated process within the APS 100. In an embodiment, a factory application may be represented as a set of constituent processes or steps which may be organized as flow of individual process modules.

Figure 8:
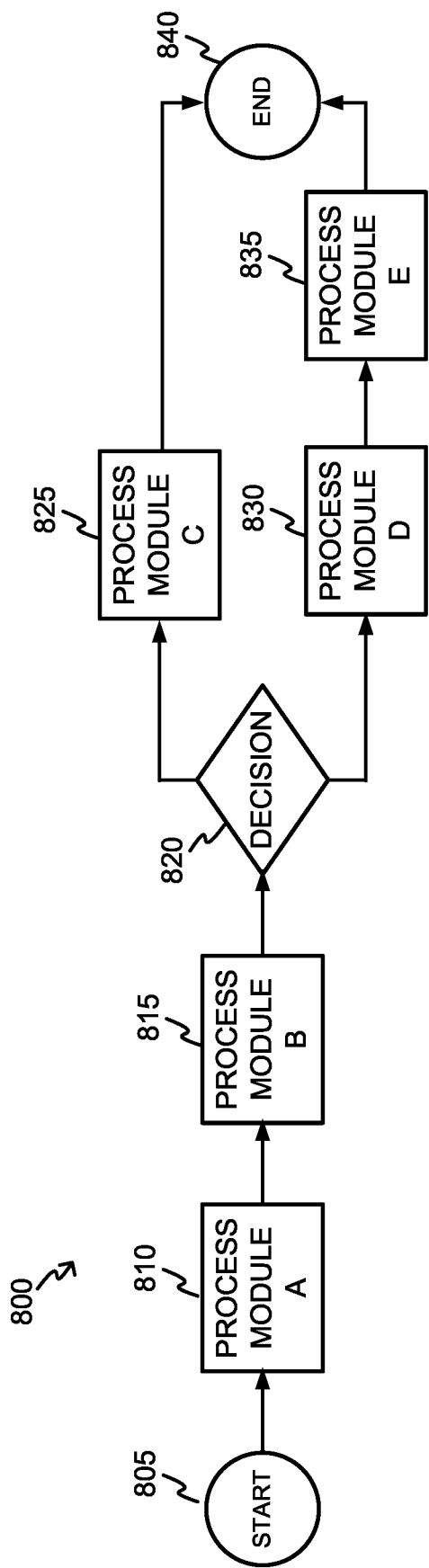
FIG. 8 shows an exemplary process flow of a factory application according to an embodiment.

An exemplary factory application 800 is shown in FIG. 8. Factory application 800 may be represented as a structured flow of process modules 810 through 835. Factory application 800 may be initialized at "START" 805, and proceed to two process modules in series, process module A 810 and process module B 815. A conditional process 820 may be performed using the results of process module B 815, and direct control to one of two branches based upon the results of decision in conditional process 820. One branch may lead to the execution of process module C 825 and then terminate at process end 840. The other branch of conditional process 820 may execute process module D 830 and then process module E 835 prior to terminating at process end 840.

Returning to the description of FIG. 6, network device 500 may identify the process modules in the received factory application (Block 610). The identification of process modules may be done in an automated manner depending on how the factory application is specified. The identification of process modules may include identifying and/or labeling each process module and/or determining the underlying structure of how the process modules are interconnected and/or arranged. Additionally, an operator can make manual adjustments by directly modifying the partitioning of the process modules and/or the structure in which the process modules are interconnected if desired. Such modifications may be made in, for example, a high-level language and/or via graphical user interfaces used to create a factory application. Network device 500 may then determine resources required by the process modules associated with the factory application (Block 615). In an embodiment, one resource which may be considered is time required for the process module to execute. Such time may be characterized as the latency of the process module. Network device 500 may quantize (or placed into bins) the latency requirements into discrete categories. In an embodiment, the latency requirements may be placed into three categories: a lower latency zone (e.g., <10 ms), a middle latency zone (e.g., 10-200 ms), and a higher latency zone (e.g., >200 ms). Other resource requirements may be considered, such as, for example, bandwidth requirements, power requirements, memory requirements, and/or processing requirements.

Figure 9:
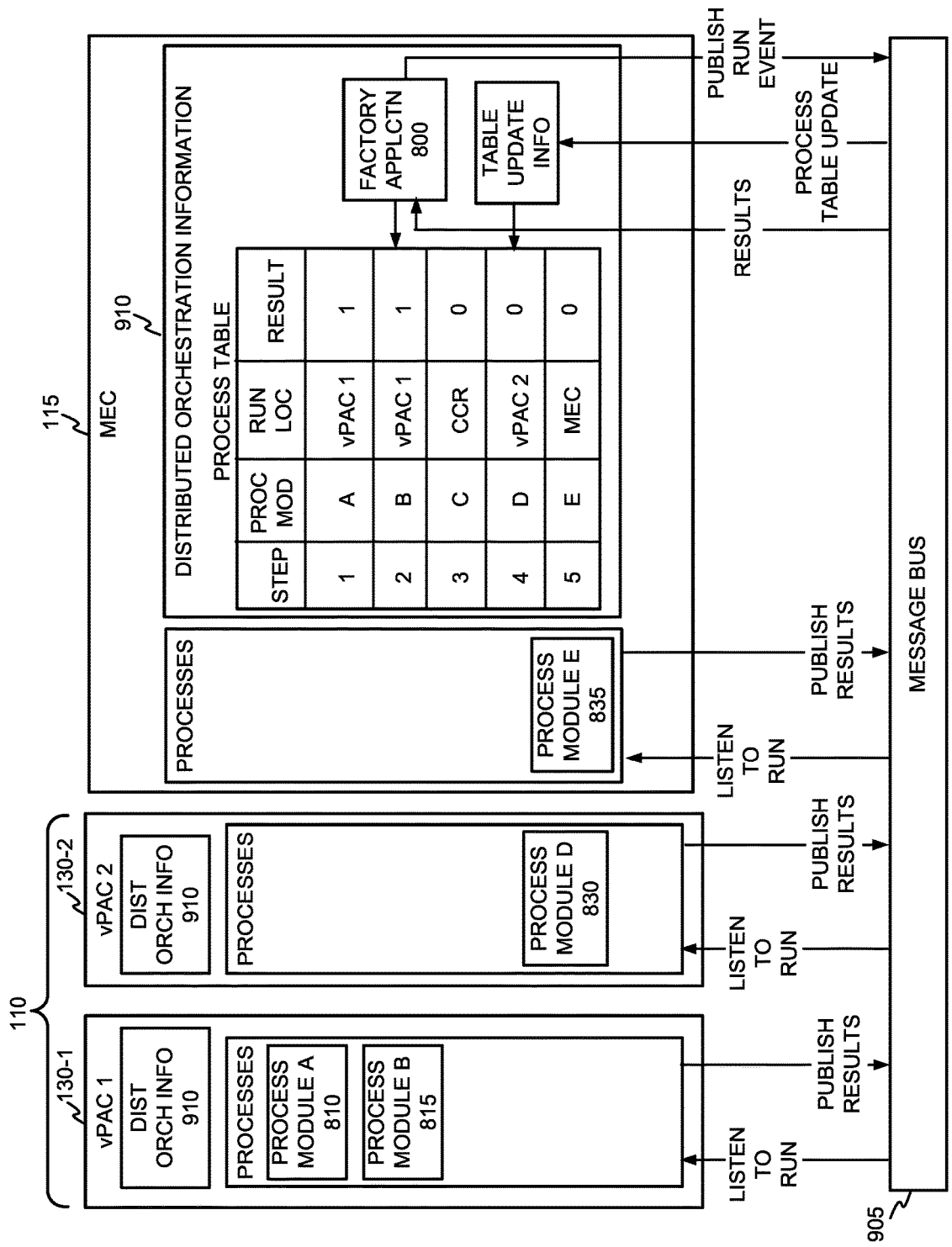
FIG. 9 is a diagram showing exemplary message flows for a plant data acquisition and control device and a MEC during the operation of APS 100.
Figure 10:
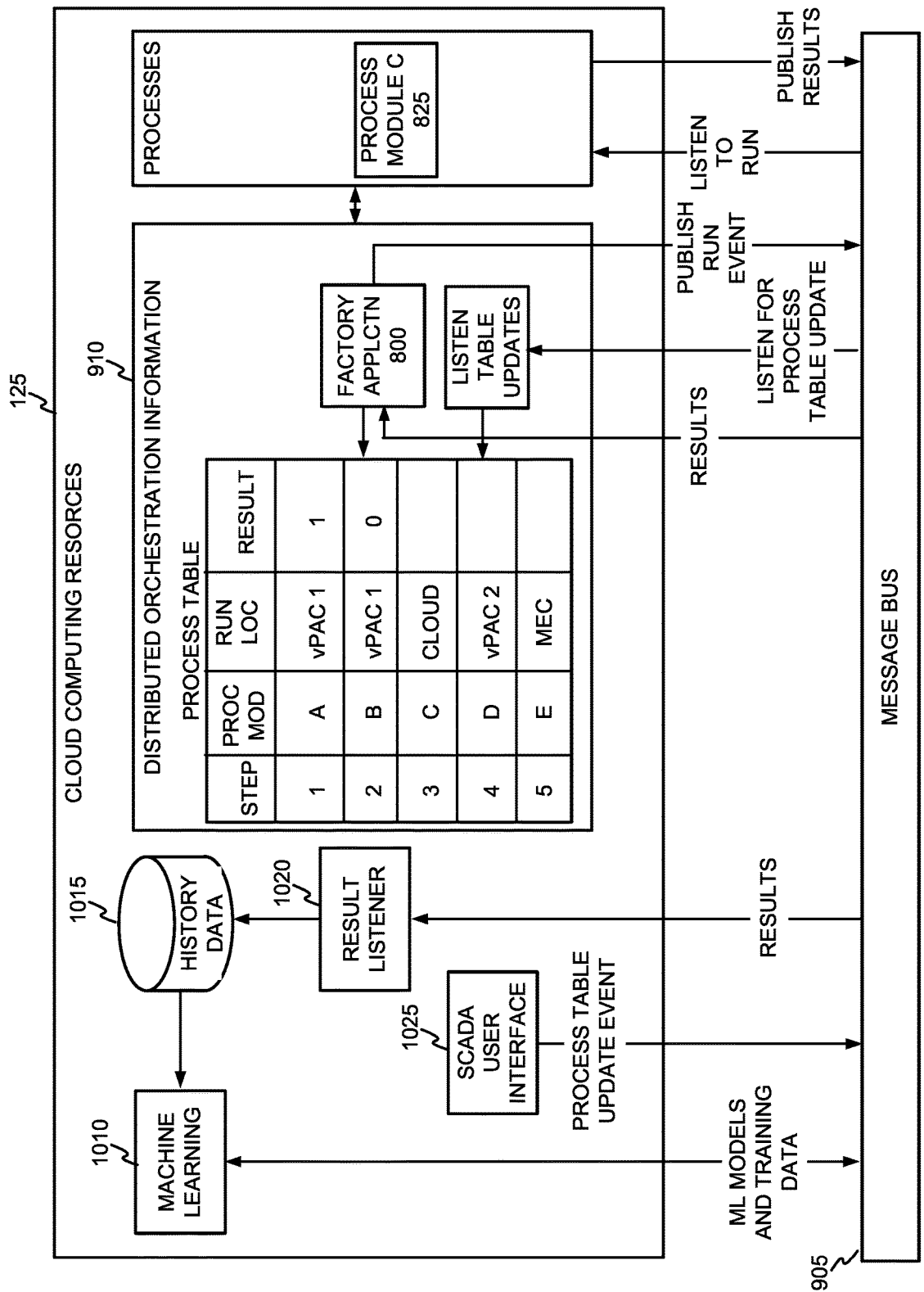
FIG. 10 is a diagram showing exemplary message flows for cloud computing resources during the operation of APS 100.

Further referring to FIG. 6, network device 500 may assign, based on the resource requirements determined in Block 615, process modules to devices (e.g., PDAC 110, MEC 115, CCR 125) for execution within the APS 100 (Block 620). For purposes of illustration, based on the exemplary factory application 800 shown in FIG. 8, network device 500 may assign process module A, process module B, and process module D to PDAC 110. In FIG. 9 (described in more detail below), process module A and process module B are associated with vPAC 1 130-1, and process module D is associated with vPAC 2 130-2. Network device 500 may assign process module E to MEC 115 (note that if network device 500 is embodied as MEC 115, MEC 115 would assign process module E to itself). Furthermore, as shown in FIG. 10, the remaining process module C may be assigned to CCR 125.

Referring back to FIG. 6, network device 500 provides distributed orchestration information 910 to devices in APS 100, such as, for example PDAC 110, MEDC 115, and/or CCR 125 (block 625). Distributed orchestration information 910 directs and synchronizes the execution of the process modules within APS 100. Details of distributed orchestration information 910 will be provided in the discussion of FIG. 9. Network device 500 may control NPDs 105 for middle latency conditions based upon the distributed orchestration information (Block 630). In addition to performing middle latency condition control during the operation of APS 100, MEC 115 may perform dynamic orchestration of process modules. Dynamic orchestration of process modules may include MEC 115 assessing the performance of the process modules, and reassigning process modules to different latency zones depending upon the assessment.

Figure 7:
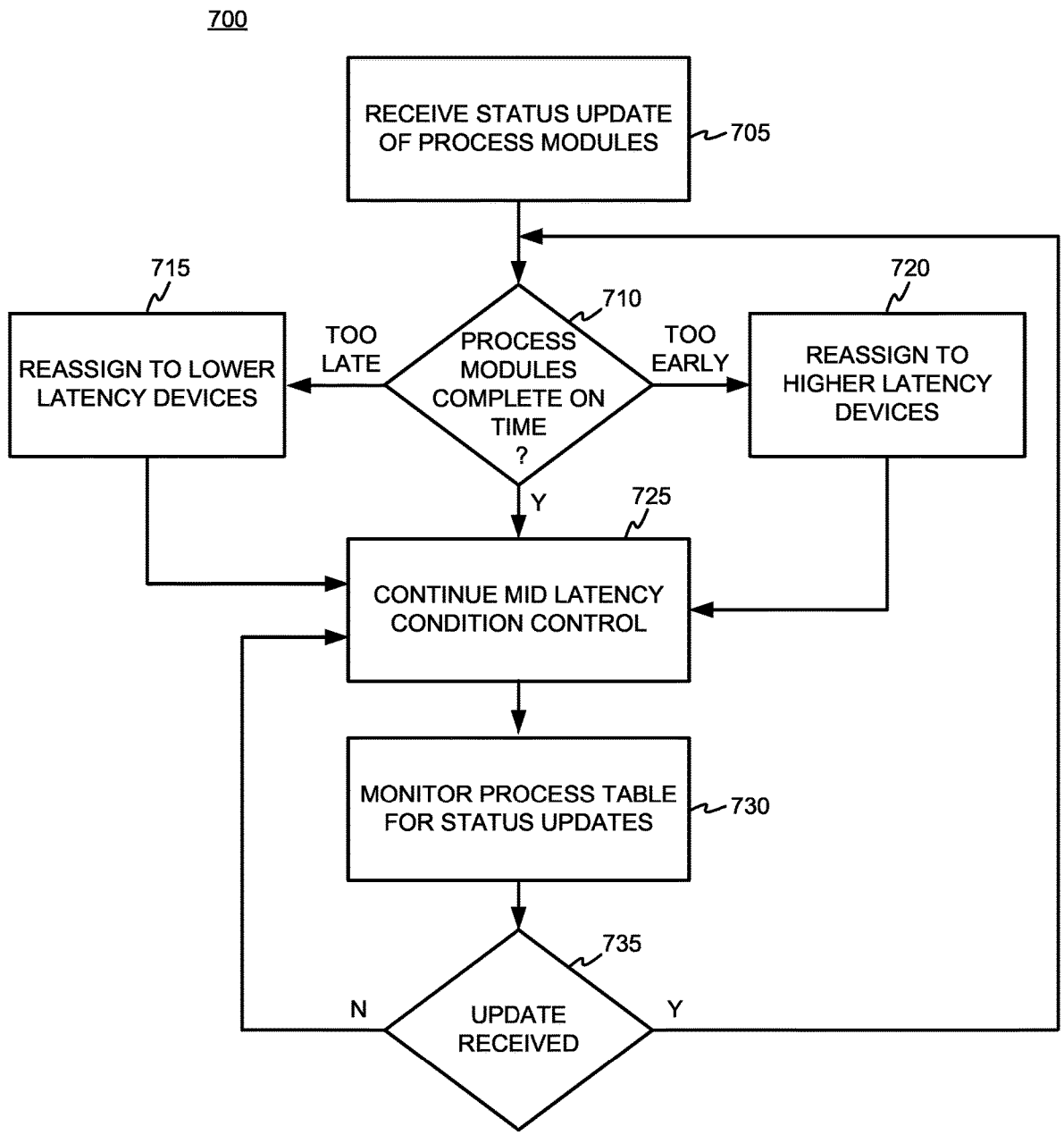
FIG. 7 shows a flowchart of an exemplary process for assessing the performance of process modules within the APS.

FIG. 7 shows a flow chart of an exemplary process for assessing the performance of process modules within the APS 100. Process 700 may include a dynamic orchestration of the process modules, and can be performed, for example, by network device 500 using processor 520. In an embodiment, network device 500 may be embodied as MEC 115. However, in other embodiments, alternate or additional devices (e.g., PDAC 110) can be associated with the execution of at least a part of process 700. In the embodiment, dynamic orchestration may be performed in whole or in-part using machine language training and execution.

Network device 500 may receive a status update for the process modules in APS 100 (including process modules in PDAC 110, MEC 115, and/or CCR 125) (Block 705). The status updates may be determined from the distributed orchestration information. Network device 500 may determine if the process modules have completed their respective tasks on time (Block 710). If network device 500 determines that the process modules have completed too late, network device 500 may reassign these process modules to devices associated with lower latency zones (Block 715). Network device may then proceed to middle latency condition control (Block 725). Alternatively, if network device 500 determines that the process modules have completed too early, network device 500 may reassign these process modules to devices associated with higher latency zones (Block 720). Network device 500 may then proceed to middle latency condition control (Block 725). In the event the process modules completed on time, network device 500 may continue middle latency condition control (Block 725). Network device 500 may monitor a process table in the distributed orchestration information for updates from the process modules distributed throughout APS 100 (Block 730). Upon receiving an update in Block 735, network device 500 may loop back to Block 710 to determine whether the process module providing the update completed on time. If an update is not received in Block 735, network device 500 may loop back and continue middle latency condition control (Block 710).

FIG. 9 is a diagram showing exemplary message flows for PDAC 110 and MEC 115 during the operation of APS 100. For purposes of explanation, the process modules shown in FIG. 9 may correspond to factory application 800 illustrated in FIG. 8. In the embodiment shown in FIG. 9, vPAC 1 130-1 and vPAC 2 130-2 may reside within PDAC 110 and have different process modules executing therein. Moreover, vPAC 1 130-1 and vPAC 2 130-2 may store copies of distributed orchestration information 910.

The distributed orchestration information 910 shown in vPAC 1 130-1 and vPAC 2 130-2 may be copies of distributed orchestration information 910 stored in other devices in APS 100 (e.g., MEC 115 and CCR 125). Process module A 810, process module B 815, and process module D 830 may execute on PDAC 110 and thus may execute in the lower latency zone (<10 ms) within virtual process controllers (vPACs). Specifically, process module A 810 and process module B 815 may execute in vPAC 1 130-1, and process module D 830 may execute in vPAC 2 130-2. Once a process module executing within a vPAC 130 produces a result (e.g., status update, diagnostic data, NPD 105 state, etc.), distributed orchestration information 910 stored internally within the associated vPAC 130 may be updated, and then a PUBLISH RESULTS message may be sent out over message bus 905. Message bus 905 may be a combination of one or more physical channels (e.g., a physical interconnect which may include, for example, wire, fiber, conductors on a substrate such as silicon, etc.) and/or one or more air channels for exchanging messages between devices. The PUBLISH RESULTS message may be sent to other devices in APS 100, whether real (e.g., MEC 115, CCR 125), or virtual (e.g., vPAC 130-2), so that these copies of the distributed orchestration information may also be updated. Various updates may be received via message bus 905, such as, for example LISTEN TO RUN updates received by devices (real and/or virtual) that are executing processes (e.g., one or more process modules 810-835). The LISTEN TO RUN message may inform a particular process module 810-835 when to begin execution.

Further referring to FIG. 9, MEC 115 may execute process module E 835, and receive LISTEN TO RUN messages via message bus 905 to know when process module E 835 should begin execution. MEC 115 may further send PUBLISH RESULTS messages via message bus 905 to send out results from process module E 835. Additionally, FIG. 9 shows further details of the distributed orchestration information 910 stored in MEC 115. Distributed orchestration information 910 may store a process table, the factory application 800, and table update information. The process table may include an order of execution (e.g., "1" through "5") of process modules 810-835 within the automated process (e.g., indicated in a column labeled "STEP"); identifiers (e.g., "A", "B", "C", "D", and/or "E") which delineate the process modules 810-835 (e.g., indicated in a column labeled "PROC MOD"); the device (e.g., "vPAC 1", "vPAC 1", "CCR", "vPAC 2", and/or "MEC") where process modules 810-835 execute (e.g., indicated in a column labeled "RUN LOC"), an indicator of status for successful completion (e.g., "1", "1", "0", "0", "0") and/or error reporting (not shown) associated with process modules 810-835 (e.g., indicated in a column labeled "RESULT"). In an embodiment, distributed orchestration information 910 may include latencies associated with process modules 810-835.

Further referring to FIG. 9, in an embodiment, distributed orchestration information may include factory application 800 and table update information for process table updates from other devices via message bus 905. MEC 115 may further monitor distributed update information collecting performance data associated with process modules, which may track/record latencies associated with process modules 810-835 over time. Process module C 825 executing within MEC 115 may be executed for controlling NPDs 105 for middle latency conditions based upon distributed orchestration information 910. For example, where "RUN LOC" in process table shown in FIG. 9 designates "MEC".

FIG. 10 is a diagram showing exemplary message flows for CCR 125 during the operation of APS 100. Process module C 825 shown in FIG. 10 corresponds to factory application 800 illustrated in FIG. 8. In the embodiment shown in FIG. 10 process module C 825 may execute in the higher latency zone (>200 ms) when controlling NPDs 105 for higher latency conditions. Once process module C 825 executing in CCR 125 produces a result (e.g., status update, diagnostic data, NPD 105 state, etc.), distributed orchestration information 910 stored internally within CCR 125 may be updated and then a PUBLISH RESULTS message may be sent out over message bus 905. The PUBLISH RESULTS message may be sent to other devices in APS 100, whether real (e.g., MEC 115), or virtual (e.g., vPAC 130-2), so that these copies of the distributed orchestration information may also be updated. Various updates may be received via message bus 905, such as, for example LISTEN TO RUN updates received by devices (real and/or virtual) that are executing processes (e.g., one or more process modules 810-830). The LISTEN TO RUN message may inform process module C 825 when to begin execution within CCR 125.

Distributed orchestration information 910 stored in CCR 125 may be a copy of the distributed orchestration information 910 when all entries are synchronized though receiving execution/diagnostic results (e.g., "RESULTS") from other process modules in APS 100, and being alerted to update messages (e.g., "LISTEN FOR PROCESS TABLE UPDATES") via message bus 905. Details of distributed orchestration table may be the same as those provided in the description of FIG. 9 and need not be repeated.

Further referring to FIG. 10, CCR 125 may perform operations which are more computationally demanding than PDAC 110 and MEC 115, and thus function in a higher latency zone greater than 200 milliseconds. CCR 125 may perform computationally intensive functions such as machine learning for modeling the automated process and orchestrating how processes are distributed among the devices in APS 100. For example, CCR 125 may use machine learning models 1010 (e.g., training and execution) by receiving training data via message bus 905, and history data 1015 pertaining to process module 810-835 performance to determine the placement of process modules 810-135 within the different latency zones, and the associated machines within respective latency zones, to improve the efficiency of APS 100. History data 1015 may be obtained through a result listener 1020 that monitors the performance (e.g., determining latency times) of process modules 810-835. The ML models having higher latency requirements may be executed within CCR 125, ML models having middle latency requirements may be provided via message bus 905 to MEC 115 for execution therein. CCR 125 may operate without direct active management by users associated with the operations of APS 100. CCR 125 may have functions distributed over multiple locations and may share resources to achieve computational performance goals and economies of scale, where services may be paid for on a subscription basis. CCR 125 may utilize SCADA interface 1025 to update the process table in distributed orchestration information 910 stored in other devices (e.g., MEC 115) via message bus 905.

In other embodiments, the approach of selecting a compute facility for executing a process based on various performance requirements may be applicable to other environments existing outside of the industrial setting described in relation to FIG. 1. For example, the operation of a mobile autonomous machine such as a general mobile robot (GMR) may depend upon the results of one or more processes which may be executed on multiple computing platforms. The decision of which compute facility (or facilities) to execute a process associated with the GMR may depend on factors that can include, but are not limited to, network latency, time of day, local, state, and/or federal government regulations and/or laws, power and/or execution time associated with the execution of one or more processes, and power source (e.g., battery) usage and/or stored energy remaining within the GMR. An example of how one or more compute facilities can be selected is illustrated in the exemplary context of a GMR operating as a delivery vehicle as described below in relation to FIG. 11.

Figure 11:
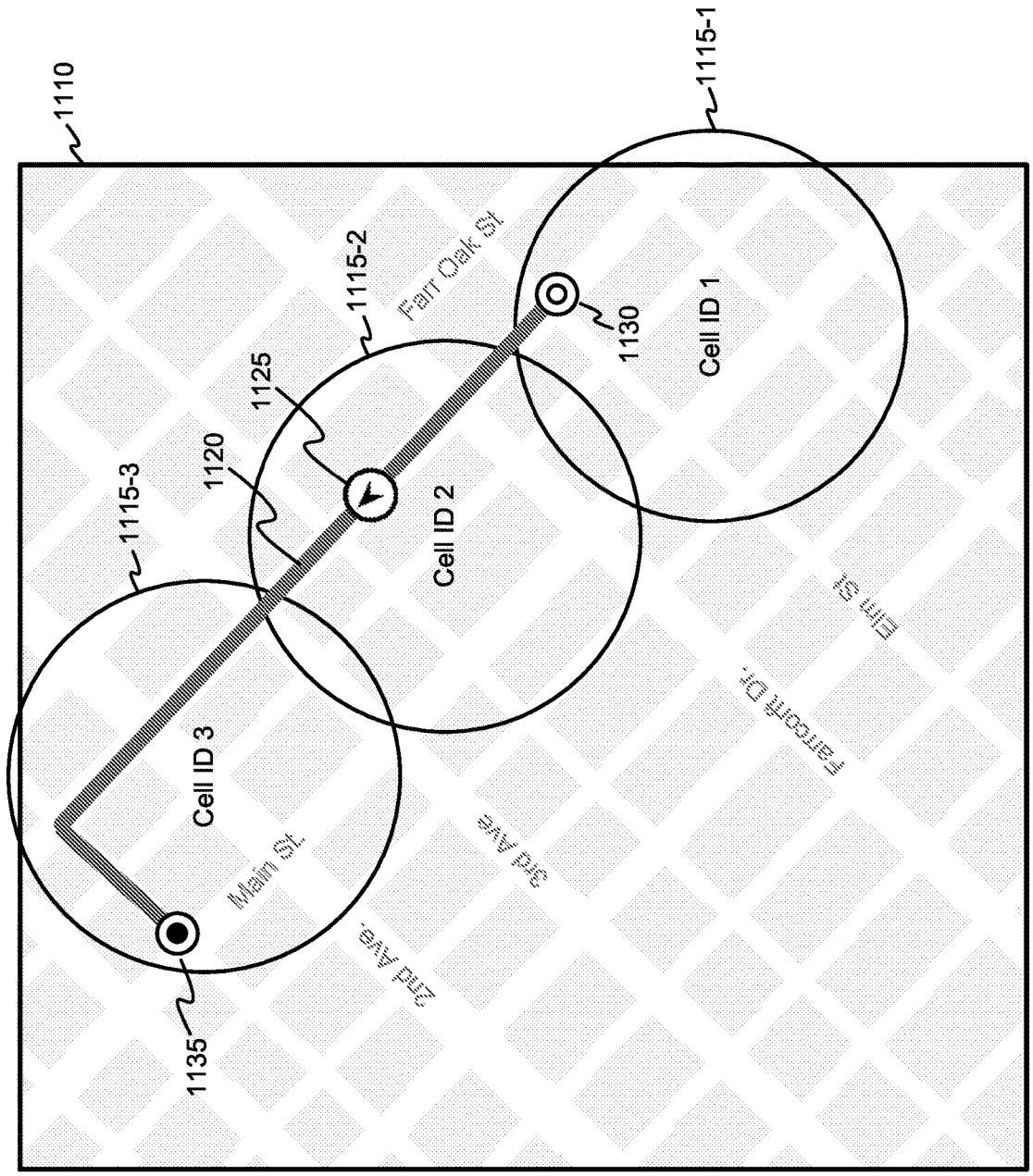
FIG. 11 shows an embodiment associated with a general mobile robot (GMR) which may select a solution from multiple solutions generated by different computing platforms.

FIG. 11 is a diagram illustrating a map 1110 showing an automated delivery vehicle (ADV) 1125 traversing over a route 1120. As used herein, ADV 1125 may be a type of GMR. ADV 1125 may begin its route at starting position 1130 on route 1120, and end the route at stopping position 1135. In this example, route 1120 may traverse through coverage areas 1115-1, 1115-2, and 1115-3 of three separate cellular base stations: Cell ID 1, Cell ID 2, and Cell ID 3. The bases stations Cell ID 1 through Cell ID 3 may be part of one or more wireless networks. As ADV 1125 traverses through coverage areas 1115-1 through 1115-3, determinations may be made as to how route 1120 is selected, and where processes can be executed during the course of ADV 1125 making a delivery.

As ADV 1125 traverses along route 1120, ADV 1125 may use a wireless transceiver to connect with each cellular base station Cell ID 1, Cell ID 2, and/or Cell ID 3 as ADV 1125 enters each coverage area 1115-1, 1115-2, and/or 1115-3, respectively. Route information may be stored within ADV 1125, which can include information regarding available compute platforms when ADV 1125 is connected to a particular base station. Compute platforms may include GMR 1202, which may be embodied within ADV 1125 itself, and/or utilize neighboring GMR's (not shown) in a parallel manner. Neighboring GMR's may also be capable of exchanging data via the wireless network with cellular base stations Cell ID 1, Cell ID 2, and/or Cell ID 3. Compute platforms may further include MEC 115 and/or CCR 125, as will be discussed in more detail below in reference to FIG. 12.

Figure 12:
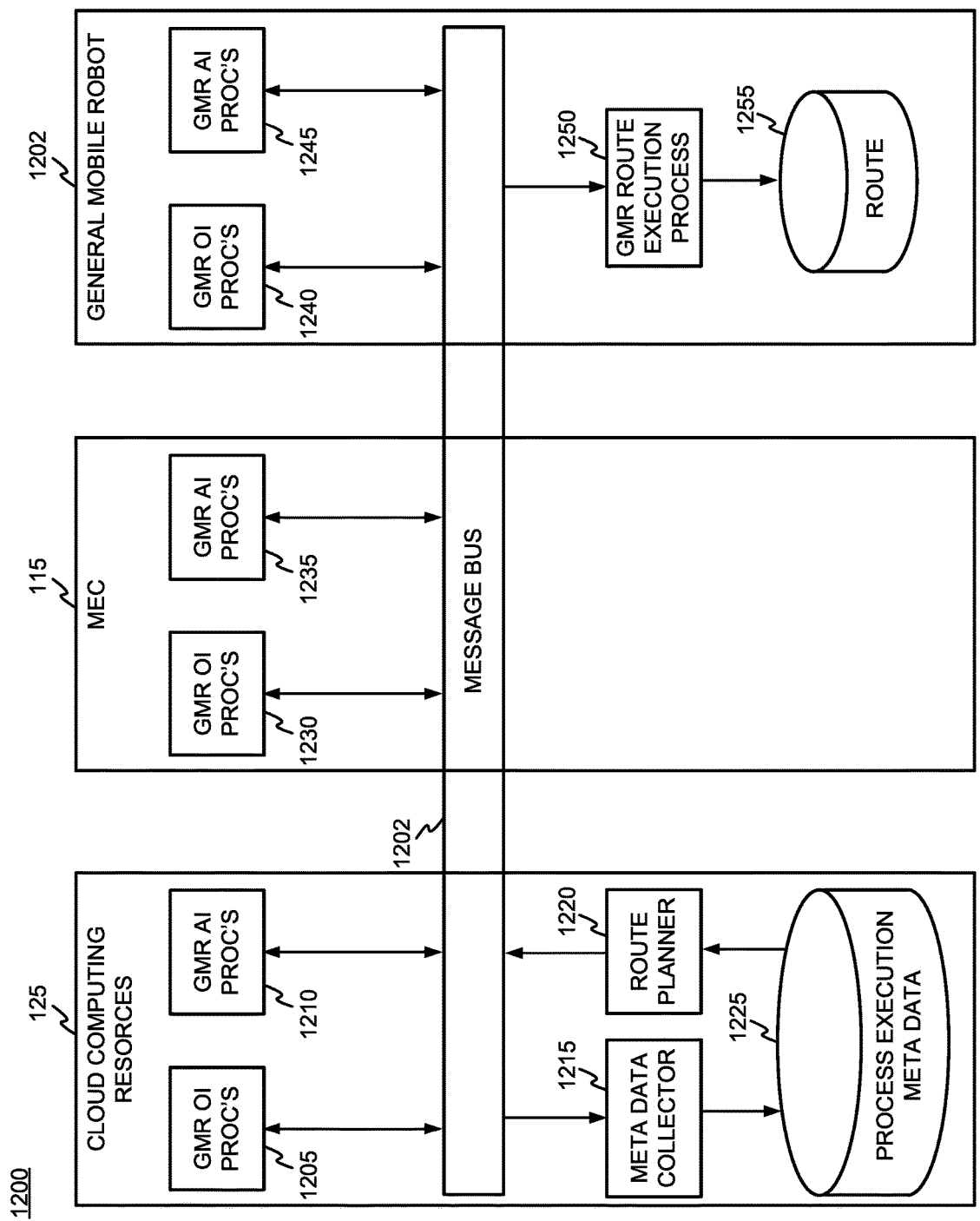
FIG. 12 shows a block diagram of an automated processes environment that facilitates the operation of a GMR.

FIG. 12 shows a block diagram of an automated processes environment 1200 for facilitating the operation of a general mobile robot (GMR) 1202. Automated processes environment 1200 may include compute platforms MEC 115, CCR 125, and GMR 1202. Each compute platform may execute process modules suitable for a variety of conditions and/or requirements, including, for example, network latency, time of day, government regulations, power requirements, stored energy supply within GMR 1202, etc. Such process modules may be derived from the factory application as described above in reference to FIG. 8. With reference to FIG. 12, CCR 125 may execute a set of process modules associated with GMR operational intelligence (OI) processes 1205. OI may include a collection of business analytics information designed to aid decision-making. OI may gather various data feeds that may represent ongoing business operations and related external factors, then analyzes and digests these feeds as the data arrives to produce actionable information. GMR OI processes 1205 may exchange data with MEC 115 and/or GMR 1202 over message bus 1202. Additionally, GMR OI processes 1205 may provide information to meta data collector 1215, which may be recorded in process execution meta data storage unit 1225. Information stored in process execution meta data storage unit 1125 may be provided to route planner 1220. Route planner 1220 may generate routing information for GMR 1202 and pass the routing information associated with a particular base station to message bus 1202 for use by other processes in automated process environment 1200. In the event that route planner 1220 does not have information associated with a particular process for a given base station, GMR 1202 may obtain a route with a message for GMR AI processes 1210 to train in order to determine a route. GMR artificial intelligence (AI) processes 1210 may provide the ability for GMR 1202 to perceive its environment and take actions to achieve preestablished goals. Such goals may include having GMR 1202 obey the local regulations, minimize power utilization, and reduce delivery time.

The GMR 1202 may request the process to run on all possible compute platforms (e.g., CCR 125, MEC 115, and/or GMR 1202). GMR 1202 may use the results from the compute platform which responds first. The meta data of a process for each platform may be saved for future use by the GMR route process. The meta data may include the process names, execution times, total latencies, time of day, day of week, estimated power consumption on GMR 1202, position (e.g., latitude, longitude), etc.

As shown in FIG. 12, each compute platform may have the same or similar processes for execution. For example, MEC 115 may include GMR OI process 1230 and GMR AI processes 1235. GMR 1202 may also include GMR OI processes 1240 and GMR AI processes 1245. GMR 1202 may further include GMR route execution processes 1250 for determining route 1120 as shown in FIG. 11. Route information may be recorded in route storage unit 1255.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

What is claimed is:

1. A method, comprising:
   receiving, at a multi-access edge computing device (MEC), a factory application defining an automated process;
   identifying process modules associated with the factory application;
   determining resources required by the process modules associated with the factory application;
   assigning, based on the determining of the resources, the process modules to devices for execution within the automated process;
   providing distributed orchestration information to the devices, wherein the distributed orchestration information includes a status of the process modules; and
   controlling networked plant devices (NPDs) for middle latency conditions based upon the distributed orchestration information.

2. The method of claim 1, wherein the controlling network plant devices further comprises:
   monitoring the distributed orchestration information for updates;
   determining, from the distributed orchestration information, an execution status of the process modules based on the updates; and
   reevaluating assignments of the process modules based an updated execution status.

3. The method of claim 2, wherein the reevaluating assignments of the process modules further comprises:
   determining process modules that completed after a predefined time limit; and
   reassigning the process modules that completed after the predefined time limit to devices associated with a lower latency zone.

4. The method of claim 2, wherein the reevaluating assignments of the process modules further comprises:
   determining process modules that completed before a predefined time limit; and
   reassigning the process modules that completed before the predefined time limit to devices associated with a higher latency zone.

5. The method of claim 1, wherein the distributed orchestration information comprises:
   at least one of latencies associated with the process modules, labels which identify the process modules, an order of execution of the process modules within the automated process, or an indicator for successful completion of the process modules.

6. The method of claim 2, wherein the monitoring the distributed orchestration information for updates further comprises:
   collecting performance data associated with the process modules.

7. The method of claim 6, wherein the collecting performance data associated with the process modules further comprises:
   recording latencies associated with each process module over time.

8. The method of claim 1, wherein the process modules and the distributed orchestration information are associated with at least one virtual process automation controller (vPAC).

9. The method of claim 1, further comprising:
   receiving a message from a general mobile robot (GMR) to determine a first route; and
   providing the first route for the GMR to traverse, wherein the GMR further receives a second route from cloud computing resources (CCR), and computes a third route internally, further wherein the GMR selects from the first route, the second route, and the third route based upon which route was determined in the least amount of time.

10. A network device, comprising:
    a communication interface; and
    a processor coupled to the communication interface, wherein the processor, when executing instructions, is configured to:
    receive, at a multi-access edge computing device (MEC), a factory application defining an automated process;
    identify process modules associated with the factory application;
    determine resources required by the process modules associated with the factory application;
    assign, based on the determining of the resources, the process modules to devices for execution within the automated process;
    provide distributed orchestration information to the devices, wherein the distributed orchestration information includes a status of the process modules; and
    control networked plant devices (NPDs) for middle latency conditions based upon the distributed orchestration information.

11. The network device of claim 10, wherein the instructions to control network plant devices further cause the processor to:
    monitor the distributed orchestration information for updates;
    determine, from the distributed orchestration information, an execution status of the process modules based on the updates; and
    reevaluate assignments of the process modules based the updated execution status.

12. The network device of claim 11, wherein the instructions to reevaluate assignments of the process modules further cause the processor to:
    determine process modules that completed after a predefined time limit; and
    reassign the process modules that completed after the predefined time limit to devices associated with a lower latency zone.

13. The network device of claim 11, wherein the instructions to reevaluate assignments of the process modules further cause the processor to:
    determine process modules that completed before a predefined time limit; and
    reassign the process modules that completed before the predefined time limit to devices associated with a higher latency zone.

14. The network device of claim 10, wherein the distributed orchestration information is stored in a memory and comprises:

at least one of latencies associated with the process modules, labels which identify the process modules, an order of execution of the process modules within the automated process, or an indicator for successful completion of the process modules.

15. The network device of claim 11, wherein the instructions to monitor the distributed orchestration information for updates further cause the processor to:
collect performance data associated with the process modules.

16. The network device of claim 15, wherein the instructions further cause the processor to:
record latencies associated with each process module over time.

17. The network device of claim 10, wherein the process modules and the distributed orchestration information are stored in a memory and are associated with at least one virtual process automation controller (vPAC).

18. The network device of claim 10, wherein the instructions further cause the processor to:
receive a message from a general mobile robot (GMR) to determine a first route;
provide the first route for the GMR to traverse, wherein the GMR further receives a second route from cloud computing resources (CCR), and computes a third route internally, further wherein the GMR selects from the first route, the second route, and the third route based upon which route was determined in the least amount of time.

19. A non-transitory computer-readable medium comprising instructions, which, when executed by a processor, cause the processor to:
receive, at a multi-access edge computing device (MEC), a factory application defining an automated process;
identify process modules associated with the factory application;
determine resources required by the process modules associated with the factory application;
assign, based on the determining of the resources, the process modules to devices for execution within the automated process;
provide distributed orchestration information to the devices, wherein the distributed orchestration information includes a status of the process modules; and
control networked plant devices (NPDs) for middle latency conditions based upon the distributed orchestration information.

20. The non-transitory computer-readable of claim 19, wherein the instructions to control the network plant devices further cause the processor to:
monitor the distributed orchestration information for updates;
determine, from the distributed orchestration information, an execution status of the process modules based on the updates; and
reevaluate assignments of the process modules based the updated execution status.

* * * * *